Feb. 11, 1964     M. J. KOOPMANS ETAL     3,121,090
AMINO-TRIAZOL DERIVATIVES
Filed April 22, 1958

TABLE I

| EXAMPLE | X | $R_1$ | $R_2$ | $R_3$ | $R_4$ | $R_5$ | MILDEW | Chlorosis | Phyto-TOXICITY | Toxicity |
|---|---|---|---|---|---|---|---|---|---|---|
| a | b | c | d | e | f | g | h | i | j | k |
| I | O | $CH_3$ | $CH_3$ | $CH_3$ | $CH_3$ | H | 1–3 | + | – | 5–10 |
| XIII | S | $CH_3$ | $CH_3$ | $CH_3$ | $CH_3$ | H | 0.01 | + | ± | 150–200 |
| II | O | $CH_3$ | $CH_3$ | $CH_3$ | $CH_3$ | $CH_3$ | 1–3 | + | – | 5–10 |
| III | O | $CH_3$ | $CH_3$ | $CH_3$ | $CH_3$ | $C_2H_5$ | 3–10 | – | ± | 5–10 |
| IV | O | $CH_3$ | $CH_3$ | $CH_3$ | $CH_3$ | $(CH_3)_2CH$ | ca.3 | – | – | 5–10 |
| V | O | $CH_3$ | $CH_3$ | $CH_3$ | $CH_3$ | $C_5H_{11}$ | 10 | – | ± | 5–10 |
| XIV | S | $CH_3$ | $CH_3$ | $CH_3$ | $CH_3$ | $C_5H_{11}$ | 0.1 | – | + | 50–100 |
| VI | O | $CH_3$ | $CH_3$ | $CH_3$ | $CH_3$ | $C_7H_{15}$ | 1–3 | – | ± | 10–20 |
| VII | O | $CH_3$ | $CH_3$ | $CH_3$ | $CH_3$ | $C_{11}H_{23}$ | 0.1–0.03 | – | + | 20–40 |
| VIII | O | $CH_3$ | $CH_3$ | $CH_3$ | $CH_3$ | phenyl | 1–3 | – | – | 10–20 |
| IX | O | $CH_3$ | $CH_3$ | $CH_3$ | $CH_3$ | phenyl-$CH_2$– | 0.1–0.03 | – | – | 5–10 |
| X | O | $CH_3$ | $CH_3$ | $CH_3$ | $CH_3$ | phenyl-CH=CH | 0.01 | – | – | 10–20 |
| XI | O | $C_2H_5$ | $C_2H_5$ | $C_2H_5$ | $C_2H_5$ | H | 0.01–0.03 | + | – | 200–400 |
| XII | O | $C_2H_5$ | $C_2H_5$ | $C_2H_5$ | $C_2H_5$ | $C_5H_{11}$ | 0.1 | | + | 1000 |
| XV | O | $CH_3$ | $CH_3$ | $CH_3$ | $CH_3$ | phenyl-Cl | 0.3 | – | ± | 10–20 |
| XVI | O | $CH_3$ | $CH_3$ | $CH_3$ | $CH_3$ | phenyl-$OCH_3$ | 0.1 | – | – | 5–10 |
| XVII | O | $CH_3$ | $CH_3$ | $CH_3$ | $CH_3$ | $CO.OC_2H_5$ | 0.01 | – | – | 600–900 |
| XIX | O | $CH_3$ | $CH_3$ | $CH_3$ | $CH_3$ | $CO.OC_3H_7^{(i)}$ | 0.01 | – | – | 400–800 |
| XVIII | O | $CH_3$ | $CH_3$ | $CH_3$ | $CH_3$ | $CO.OC_5H_{11}$ | 0.03 | – | – | 400–800 |

FIG I

TABLE II

| | X | $R_1$ | $R_2$ | $R_3$ | $R_4$ | $R_5$ | Aphis fabae Scop | | | | | | | | | | Tetranychus urticae Koch | | | | | | | | | |
|---|---|---|---|---|---|---|---|---|---|---|---|---|---|---|---|---|---|---|---|---|---|---|---|---|---|---|
| | | | | | | | A | | | | | B | | | | | A | | | | | B | | | | |
| | | | | | | | 1000 | 300 | 100 | 30 | 10 | 62.5 | 12.5 | 2.5 | 0.5 | 0.1 | 1000 | 300 | 100 | 30 | 10 | 62.5 | 12.5 | 2.5 | 0.5 | 0.1 |
| I | O | $CH_3$ | $CH_3$ | $CH_3$ | $CH_3$ | H | + | + | + | + | – | + | + | + | + | ± | + | + | + | + | ± | + | + | + | + | ± |
| XIII | S | $CH_3$ | $CH_3$ | $CH_3$ | $CH_3$ | H | + | + | ± | – | – | + | + | + | + | ± | + | + | – | – | – | + | + | + | + | ± |
| II | O | $CH_3$ | $CH_3$ | $CH_3$ | $CH_3$ | $CH_3$ | + | + | + | + | + | + | + | + | + | + | + | + | + | + | ± | + | + | + | + | + |
| III | O | $CH_3$ | $CH_3$ | $CH_3$ | $CH_3$ | $C_2H_5$ | + | + | + | + | ± | + | + | + | + | + | + | + | + | + | ± | + | + | + | + | ± |
| IV | O | $CH_3$ | $CH_3$ | $CH_3$ | $CH_3$ | $CH(CH_3)_2$ | + | + | + | + | – | + | + | + | + | + | + | + | + | + | – | + | + | + | + | ± |
| XIV | S | $CH_3$ | $CH_3$ | $CH_3$ | $CH_3$ | $C_5H_{11}$ | + | – | – | – | – | + | + | ± | – | – | + | + | ± | – | – | + | + | ± | – | – |
| V | O | $CH_3$ | $CH_3$ | $CH_3$ | $CH_3$ | $C_5H_{11}$ | + | + | + | ± | – | + | + | + | + | ± | + | + | + | + | + | + | + | + | + | ± |
| VIII | O | $CH_3$ | $CH_3$ | $CH_3$ | $CH_3$ | phenyl | + | + | + | + | ± | + | + | + | + | + | + | + | + | + | + | + | + | + | + | – |
| IX | O | $CH_3$ | $CH_3$ | $CH_3$ | $CH_3$ | $CH_2$–phenyl | ± | – | – | – | – | + | + | + | ± | – | + | + | + | + | + | + | + | + | + | + |
| X | O | $CH_3$ | $CH_3$ | $CH_3$ | $CH_3$ | CH=CH-phenyl | + | + | + | – | – | + | + | + | + | + | + | ± | – | – | – | + | + | ± | – | – |
| VI | O | $CH_3$ | $CH_3$ | $CH_3$ | $CH_3$ | $(CH_2)_4CH_3$ | + | + | + | – | – | + | + | – | – | – | + | + | + | | | + | – | – | | |
| VII | O | $CH_3$ | $CH_3$ | $CH_3$ | $CH_3$ | $(CH_2)_6CH_3$ | – | – | – | – | – | – | – | – | – | – | ± | – | – | – | – | – | – | – | – | – |
| XV | O | $CH_3$ | $CH_3$ | $CH_3$ | $CH_3$ | phenyl-Cl | + | + | + | ± | – | + | + | + | + | ± | + | + | + | + | ± | + | + | ± | – | – |
| XVI | O | $CH_3$ | $CH_3$ | $CH_3$ | $CH_3$ | phenyl-$OCH_3$ | + | ± | – | – | – | ± | – | – | – | – | – | – | – | – | – | – | – | – | – | – |
| XVII | O | $CH_3$ | $CH_3$ | $CH_3$ | $CH_3$ | $COOC_2H_5$ | – | – | – | – | – | + | + | + | ± | – | – | – | – | – | – | + | + | ± | – | – |
| XIX | O | $CH_3$ | $CH_3$ | $CH_3$ | $CH_3$ | $COOC_3H_7^{(i)}$ | + | + | ± | – | – | + | + | + | + | – | ± | – | – | – | – | + | + | + | ± | – |
| XVIII | O | $CH_3$ | $CH_3$ | $CH_3$ | $CH_3$ | $COOC_5H_{11}$ | – | – | – | – | – | + | + | + | ± | – | – | – | – | – | – | + | + | – | – | – |

FIG II

INVENTORS
MARTINUS JOHANNES KOOPMANS
JACQUES MELTZER
HENDERIKUS OBIAS HUISMAN
BERNARDUS GERHARDUS VAN DEN BOS
KOBUS WELLINGA
BY Frank R. ____
AGENT United States Patent Office 3,121,090
Patented Feb. 11, 1964

3,121,090
AMINO-TRIAZOL DERIVATIVES
Martinus Johannes Koopmans, Jacques Meltzer, Henderikus Obias Huisman, Bernardus Gerhardus van den Bos, and Kobus Wellinga, all of Van Houtenlaan, Weesp, Netherlands, assignors to North American Philips Company, Inc., New York, N.Y., a corporation of Delaware
Filed Apr. 22, 1958, Ser. No. 730,130
Claims priority, application Netherlands Apr. 27, 1957
10 Claims. (Cl. 260—308)

The invention relates to a method of producing new amino-triazol derivatives. From laboratory experiments it has been found that these products are suitable for combating noxious organisms.

The invention is characterized in that a

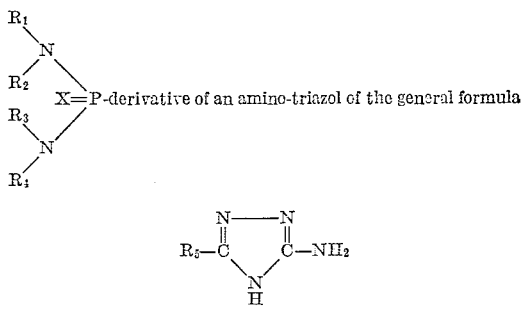

$X = P$-derivative of an amino-triazol of the general formula

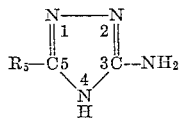

or of a tautomeric form thereof is produced by suitable methods, in which derivative the phosphorous atom is bound to one of the nitrogen atoms of the triazol-ring and in which furthermore $R_1$, $R_2$, $R_3$ and $R_4$ designate aliphatic hydrocarbon radicals, X a double-bonded oxygen- or sulphur atom and $R_5$ designates a hydrogen atom, an alkyl-, cycloalkyl-, or aralkyl-group.

The production of the compounds according to the invention is furthermore characterized in that a compound of the general formula:

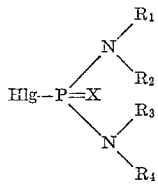

a tautomeric form or a salt of either of them is caused to react with a compound of the general formula:

$$\text{Hlg}—P{=}X \begin{array}{c} R_1 \\ \diagdown \\ N \\ \diagup \\ R_2 \\ \diagdown \\ R_3 \\ \diagup \\ N \\ \diagdown \\ R_4 \end{array}$$

in which formulae $R_5$ designates a hydrogen atom or an alkyl-, cycloalkyl-aryl- or aralkyl-group, in which groups one or more substituents and/or unsaturated bonds may be contained, $R_1$, $R_2$, $R_3$ and $R_4$ designate aliphatic hydrocarbon radicals, X designates a double-bonded oxygen- or sulphur atom and Hlg a halide atom, for example a chlorine or bromine atom, so that a product is obtained, in which the hydrogen atom bound to nitrogen in the amino-triazol ring is replaced by the bis (N.N.-dialkylamido)-phosphoryl- or -thiophosphoryl-group, in such a way that the phosphorous atom is bound to a nitrogen atom of the triazol ring.

It has been found that reaction products with attractive properties are obtained, in particular, if 3-amino-1.2.4-triazol or a derivative thereof according to the definition of the invention is used as a starting material, in which $R_5$ is an aliphatic hydrocarbon radical having 1 to 8 carbon atoms, a phenyl group, 4-chloro-phenyl-, 4-methoxy-phenyl-, carboxy-alkyl-, benzyl- or styryl-group. In the phosphoryl- or thiophosphoryl-compounds $R_1$, $R_2$, $R_3$ and $R_4$ are preferably aliphatic hydrocarbon radicals having 1 to 5 carbon atoms, particularly methyl groups. The method is preferably carried out with bis(N.N-dialkyl-amido)-phosphoryl- or -thiophosporyl-chloride.

As a salt of 3-amino-triazol 1,2,4 or of the $R_5$-derivative may be used, for example, the hydrochloric acid salt, the sulphuric acid salt or the bisulphate.

In the cases, in which the starting material is 3-amino-triazol 1.2.4, the $R_5$ derivative thereof or the salts of an acid, for example hydrochloric acid or sulphuric acid or the bisulphate of one of them, the choice of the solvent is primarily determined by the solubility of 3-amino-triazol 1.2.4 or the $R_5$ derivative thereof, since the phosphoryl- or thiophosphoryl-compounds employed in accordance with the invention are satisfactorily soluble in a great many of the conventional solvents.

In these cases suitable solvents are: liquid aliphatic hydrocarbons, for example petroleum ether, ligroin, hexane, cyclohexane, aromatic hydrocarbons, for example, benzene, toluene, xylene; aliphatic ethers, for example diethyl ether, methyl-ethyl ether, diisopropyl ether, tetrahydrofurane, tertiary amines, for example, triethylamine pyridine picolines, lutidines or collidines or mixtures thereof. As a suitable solvent may be mentioned acetonitril. If desired, lower aliphatic ketones may be used, for example, acetone or methyl-ethyl ketone, but in this case, it should be considered that these solvents can react with the triazol-derivative whilst forming a Schiff's base. Other solvents are ethyl-acetate, ethyl-formiate, nitrobenzene, carbon tetrachloride and dimethylformamide.

In general, amino-triazol and derivatives thereof, of which the group $R_5$ contains more than 5 carbon atoms, are better soluble in liquids of lower polarity. For this reason, when using these amino-triazol derivatives, it is to be preferred to use aliphatic or aromatic hydrocarbons or ethers over the other aforesaid of higher polarity. The latter group of solvents may be often used successfully, if an amino-triazol is used as a starting material, in which $R_5$ is hydrogen or a carbon chain having less than 5 carbon atoms. Mention may be made of acetonitril and furthermore a liquid tertiary amine, preferably pyridine or the homologues thereof: the picolines, lutidines and collidines.

It should otherwise be noted that, for a successful reaction, it is, indeed, desirable but not necessary that the two reaction components should be in a completely dissolved state from the start of the process. The reaction is also accomplished, if, for example, the triazol derivative is contained partly in the diluent in a roughly dispersed state.

It is furthermore important to carry out the reaction in the presence of an acid binder. The amino-triazol or $R_5$-derivative thereof, used as starting material, may serve as such, in which case an excess quantity of this compound is employed.

A group of acid binders which may be successfully used, are amines and particularly tertiary amines, for example of the group consisting of trialkylamines, N.N-dialkylanilines; trimethylamine, triethylamine, diethylaniline and furthermore pyridine or homologues thereof, for example the picolines, lutidines or collidines and furthermore triethanolamine. As a primary amine use may be made of ethanolamine, as a secondary amine for example diethanolamine. Even the amino-triazol derivative, which is the starting material and which is obtained by the reaction according to the invention may operate as an acid binder. In general, use will be made of a quantity of acid binder which is equivalent to the quantity of hydrogen halide set free during the reaction but there is no objection to use a larger quantity.

If an excess quantity of 3-amino-1.2.4 triazol or an $R_5$ derivative thereof or of the said amines are used as an acid binder the reaction is preferably carried out at a temperature lying between 0 and 80° C., for example, at a temperature of about 40° C. to 70° C.

After the termination of the coupling reaction between the aminotriazol or an $R_5$-derivative thereof with the phosphorylhalide or the thio-phosphorylhalide it is advisable to purify the reaction product. This may be carried out by removing the solvent, for example by evaporation in vacuo. The residue, which contains apart from the reaction product the hydrogen halide salt of the acid binder and, as the case may be, unchanged starting material may then be extracted with a suitable solvent, for example an aromatic or aliphatic hydrocarbon, such as toluene, xylene, benzene, hexane, petroleum ether, ligroine or an aliphatic ether, for example, ethyl ether or dimethyl ether. From the extract thus obtained, which is substantially free from the salt of the employed acid binder, the purified reaction product may be obtained by conventional purifying methods, for example, recrystallisation. If the amino-triazol derivative contained a group $R_5$ with more than 4 carbon atoms, the aforesaid extract may be purified by washing it with water. With this treatment an excess quantity, if any, of phosphoryl- or thiophosphoryl-compound, as well as the acid binder, if at least the latter compound is soluble in water, are removed.

It has furthermore been found that very satisfactory results are obtainable when using a different group of acid binders. This group comprises metal compounds and ammonium compounds, which are suitable to bind the hydrogen halide set free during the reaction according to the invention; with particular advantage there may be used those of alkaline-earth metals, for example, those of calcium and barium and, particularly those of alkali metals, for example those of sodium and potassium. As metal compounds may be used oxides, hydroxides, carbonates, bicarbonates, alcoholates and metal salts of carboxylic acids for example acetates and propionates, for instance sodium-, potassium-, calcium-, magnesium- and zinc-hydroxide, calcium-, barium- and zinc-oxide, sodium- and potassium-carbonate and -bicarbonate, magnesium-, calcium- and barium-carbonate, sodium- and potassium-alcoholates and sodium acetate. As ammonium compounds use may be made of ammonia, ammonium-carbonate and -acetate.

Suitable acid binders in accordance with the method of the invention are the metal hydroxides, particularly calcium- and barium- and particularly sodium- and potassium-hydroxide. Very satisfactory acid binders are, furthermore, the alkaline metal alcoholates, such as sodium-, and potassium-methanolate and ethanolate.

With the reaction according to the invention of 3-amino-triazol-1.2.4 or the $R_5$-derivative thereof with a phosphoryl- or thiophosphoryl halide in the presence of a metal compound as an acid binder, the metal halide is separated out. This reaction may be carried out in different ways.

A suitable method is that in which as an acid binder use is made of an alkali metal alcoholate. In this case, preferably the 3-amino-triazol-1.2.4 or the $R_5$-derivative thereof is dissolved in a solution of an alkali metal alcoholate in anhydrous alcohol, particularly a lower alcohol and more particularly methanol or ethanol, to which is added the phosphoryl halide or thiophosphoryl halide derivative. The alcoholate may be formed, for example, by dissolving the alkaline metal in the alcohol to be used as a solvent.

When using a metal hydroxide as an acid binder, a suitable method for the reaction according to the invention consists in that the 3-amino-triazol-1.2.4 or the $R_5$ derivative thereof is dissolved in a polar organic solvent, in which the metal hydroxide is dissolved, or suspended in a finely divided state, after which the phosphoryl halide or the thiophosphoryl halide derivative is added.

The metal hydroxides are particularly those of sodium and potassium and those of calcium and barium. When using sodium- or potassium hydroxide, it is advantageous to use, as a polar organic solvent, a lower alcohol, for example methanol or ethanol, since these hydroxides are soluble in these alcohols. The reaction is then carried out in a homogeneous medium.

It has been a surprise to find that the reaction according to the invention may yield, moreover, very satisfactory results of, as an acid binder, use is made of aqueous alkaline-earth- or alkaline-hydroxides. One method which yields particularly satisfactory products according to the invention in substantially theoretical quantities is that in which the 3-amino-triazol-1.2.4 or the $R_5$ derivative thereof is dissolved in a mixture of a polar organic solvent, preferably a lower alcohol, for example methanol or ethanol and, for example, the theoretically required quantity of alkali-hydroxide, for example as a 30 to 50% by weight solution is dissolved in water, to which the phosphoryl halide or the thiophosphoryl halide is added. Particularly satisfactory results are obtained by using a mixture of methanol or ethanol and 30 to 50% aqueous solution of sodium- and potassium-hydroxide. In these cases, yields of 90 to 100% of the desired product may be obtained. The term theoretically required quantity of alkali-hydroxide is to be understood to mean herein the quantity required to bind the maximum quantity of hydrogen halide set free during the reaction.

The use of alkali-metal hydroxides as acid binders and the use of lower alcohols as solvents are advantageous to the technical performance of the reaction, since in this case the reaction takes place in a homogeneous medium. An advantage of the use of an aqueous solution of alkali-hydroxide over that of solid alkali-hydroxide is that in the first case a homogeneous solution is obtained immediately after mixing. When using solid alkali-hydroxide some time passes before it is dissolved.

For carrying out the reaction according to the invention, in which metal compounds are used as acid binders, use is preferably made of polar solvents, for example alcohols such as propanol, isopropanol, butanol, secondary butanol and iso-butanol and particularly, methanol or ethanol and ketones such as acetone and methyl-ethyl ketone or acetonitril. Even non-polar solvents such as aliphatic hydrocarbons and aromatic hydrocarbons, for example benzene, toluene or xylene may be used. Since, however, the metal compound to be used as an acid binder is soluble herein only with difficulty, the reaction is performed less smoothly in these cases.

The yields of compounds according to the invention usually exceed, when metal compounds are used as acid binders and when polar solvents are used, as a rule those obtained when amines are used as acid binders. These higher yields, which may attain the theoretical values, are to be ascribed, inter alia, to the simplicity of the working up and purification of the reaction product and, probably particularly to the smooth reaction even at a low temperature, so that no or substantially no by-products will be formed.

It is known that the phosphoryl chlorides and thiophosphoryl chlorides, as acid chlorides, are sensitive to the effect of water and metal hydroxide solutions.

Quite contrary to the expectations it has now been found that even satisfactory results may be obtained, when the reaction according to the invention is carried out with a suspension of 3-amino-triazol-1.2.4 or the $R_5$ derivative thereof in a concentrated aqueous solution or suspension of an alkali metal or alkaline earth metal hydroxide. When carrying out the reaction according to the invention in a 50% aqueous sodium- or potassium-hydroxide solution, yields of 70 to 80% of the desired products were obtained.

With this method the compounds according to the invention, in which $R_5$ designates an alkyl group with at least 5 carbon atoms or a cycloalkyl-, aralkyl- or aryl-group, can be separated out in a very simple manner after the reaction has terminated, since they separate out in a finely divided, solid state.

The method according to the invention in which a metal compound is used as an acid binder, provides, as a rule, a smooth reaction and may be carried out at normal temperature. The reaction temperature is preferably chosen to be slightly lower, for example between $-10$ and $+10°$ C.; this particularly obtains, if the reaction is carried out in an aqueous and particularly a homogeneous medium.

It has been found that the method according to the invention, in which metal compounds are used as acid binders and the methods in which amines are used for the same purpose, yield the same products.

3-amino-triazol-1.2.4 and $R_5$ derivatives thereof have a somewhat amphoteric nature. This means that there may exist not only salts of, for example, hydrochloric acid, but also metal salts. Therefore it is not impossible that, in those cases in which a metal compound, for example sodium is used as an acid binder, at least partly the sodium salt of the employed amino-triazol should be formed, which might react with the phosphoryl halide or thio-phosphoryl halide. For example the sodium salt of a 3-amino-triazol-1.2.4 may be separated out by evaporating an alcoholic solution of sodium alcoholate and a 3-amino-triazol-1.2.4 until no alcohol can any longer be removed. If the sodium salt of the 3-amino-triazol-1.2.4 derivative thus obtained is suspended for example in benzene and if the suspension obtained is heated for some time, after the addition of a phosphoryl halide, a satisfactory quantity of a compound according to the invention is obtained.

It should be noted that the amino-triazol and the said derivatives thereof, employed in accordance with the invention, may occur in tautomeric forms. This means that the hydrogen atom bound to one of the nuclear nitrogen atoms does not occupy a fixed position. In order to fix the idea, the amino-triazol or a derivative thereof in accordance with the present application is assumed to be given by a formula in which this hydrogen atom is bound to the nitrogen atom indicated by ring atom number 4. In accordance with conceptions expressed in literature this does not mean, however, that this hydrogen atom could not be bound to any of the other atoms of the amino-triazol (J. Org. Chem., XVIII, page 196 (1953)).

The tautomerism with amino-triazol-1,2,4 and $R_5$ derivatives thereof involves that it cannot be stated with the reaction products thereof with bis (N.N-dialkyl-amido)-phosphoryl halides, with which of the three nitrogen atoms in the triazol-ring the phosphoryl-group is bound. From the experiment, which led to the invention, it has been found that with a definite reaction mainly one product is always formed, which has a well-defined melting point, as will be evident from the examples to be described hereinafter.

Among the amino-triazol derivatives to be used in accordance with the invention there are known the compounds in which $R_5 = H$, $CH_3$, $C_2H_5$, $C_3H_7$, iso-$C_3H_7$, iso-$C_4H_9$, n-pentyl, n-hexyl and phenyl. The further compounds in which $R_5$ may be, for example, butyl, heptyl, aralkyl, and so on, may be produced from an amino-guanidine salt, for example the nitrate, bisulphate or sulphate and a carboxylic acid of the formula $R_5$—COOH or the corresponding acid halide, preferably the acid chloride. For the production of the amino-triazol itself the principle of this method is described in Organic Synthesis 26, page 11. The bis-dialkyl-phosphorylhalide and the corresponding thio-compounds may be produced by a method as indicated in the German patent specification No. 900,814.

In accordance with the invention it has now been found that the products obtained by the method according to the invention have as is shown by laboratory experiments, an activity against noxious organisms, especially against particular fungi and insects and, moreover, red spider mites.

It has particularly been found that many compounds have an activity against fungi of the family of the Erysiphaceae. To this family belong, for example, the kinds:

(a) *Sphaerotheca pannosa* (Wallr.) Lév (rose),
(b) *Erysiphacichoracearum* D.C.—cucumber, potato, salad, sunflower, tobacco,
(c) *Erysiphe polygony* D.C.—clover and other leguminoses,
(d) *Uncinula necator* (Schw.) Burr.—grape,
(e) *Erysiphe graminis* D.C.—cereals,
(f) *Sphaerotheca mors ural* (Schw.) Berk.—gooseberry,
(g) *Podosphaera leucotricha* (Ell et Everh) Salm.—apple, pear. After the names of the fungi there are indicated the plants on which the corresponding fungi may occur.

Plants, of which the overground parts were sprayed by a product according to the invention, were appreciably less affected by the aforesaid fungi than untreated plants.

A protection from the effect by these fungi was also observed when a product obtained in accordance with the invention was inserted into the root system of the plant (emphytical effect).

The said fungicidal effect is particularly manifest with those reaction products which are obtained by causing an amino-triazol, in which the group $R_5$ designates a hydrogen atom, a lower aliphatic radical having 1 to 8 carbon atoms or a phenyl group to react with a bis (N.N-dimethylamido)-phosphoryl-halide, preferably the chloride.

The experiments by which the aforesaid fungicidal effect was stated were carried out as follows.

Young barley plants (*Hordeum vulgare*) were cultivated at a temperature of 15° C. to 18° C. in small flowerpots until the plants had a length of about 7 cms. Then solutions of the compounds to be tested in acetone of different concentrations were sprayed on them. As a rule, a series of dilutions comprises solutions containing 1000, 100 or 10 mgs. of active compound per litre. Seven plants in one pot were sprayed simultaneously with 0.2 ml. of the solution. The experiment was repeated twice with 7 plants each. In total 21 plants were thus treated with the same liquid. Immediately after the treatment with the solution, the plants were dusted with viable sporules of *Erysiphe graminis* mildew by putting the pots of the whole test series simultaneously under a spaceous bell-glass, into which, by means of a flow of air brushing past strongly infected leaves of barley, were distributed the sporules of mildew. The plants were left to themselves for some time, so that the sporules settled down uniformly on the plants. The plants were then put into a space having a temperature of 18° C. to 20° C. and a relative humidity of about 90%, under a continuous illumination by fluorescent tubes (white light) having an intensity of about 300 lux. Five days after the inoculation distinct spots of the mildew fungus had been formed on the test plants not treated with an active compound these spots giving off a fair moment of sporules.

The extent of the damage of each plant was expressed by a numeral of the series 0 to 10, 0 being equal to no effect and 10 meaning that the whole leaf was covered with stains.

Per concentration—21 statements—the numbers obtained were added.

Since the various substances were tested at different dates, which might affect the results, the measure of damage of each plant was always compared with the one obtained when 2,4-dinitro-6 (1'-methylheptyl-1-phenyl-crotonate) was used as a protecting compound. Those doses were therefore each time determined which resulted both with the compound to be tested and with the phenyl-crotonate-derivative, in a protection of 50% for the plant. The quotients of these doses are indicated in Table I (FIG. 1) in column $h$. With a higher quotient the fungicidal effect of the tested compound is, therefore, also higher.

In this table the column $a$ indicates the numeral of the example, in which the production of the tested amino-triazol-derivative is described. The columns $b$ to $g$ indicate the kind of substituents X and $R_1$ to $R_5$. Column $h$ shows the anti-eryisphaceaes effect as compared with 2,4-dinitro-6-(1'-methylheptyl)-1-phenylcrotonate (on barley plants). In column $i$ "+" means that a dose of 30 mgs. of the tested compound per pot (in which was cultivated tomato, oat plants, garden beans, chickweed or beets) produces chlorosis. The reference "—" has the opposite meaning. Column $j$ mentions the extend of leaf burning with a spraying of 1% of aqueous emulsion or a solution of the substance on tomato, oats, garden beans, chickweed or beet. "—" means: no damage; "±" is: little damage and "+" is: fairly heavy damage. Column $k$ finally indicates the toxicity for warmblooded animals. The numbers indicated are the doses in mg./kg. mice (test animals), producing a kill of 50% of the animals upon oral application ($LD_{50}$).

It has furthermore been found that the reaction products obtained in accordance with the invention have also an activity against insects, for example *Musca domestica* L, *Sitophilus granarius* L, *Leptinotarsa decemlineata* Say, *Aphis fabae* Scop. The active compounds constitute both contact poisons and stomach poisons for the insects. It was, moreover, stated that leaf-eating and juice-sucking insects on the overground parts of plants are killed, if the reaction products obtained in accordance with the invention are inserted into the root system.

This insecticidal effect occurs particularly with those compounds according to the invention which are obtained by the reaction of an amino-triazol derivative, according to the invention, in which $R_5$ designates a hydrogen atom or an aliphatic hydrocarbon radical having 1 to 5 carbon atoms or a phenyl radical, with a bis N,N-dimethyl-amido)-phosphoryl- or thiophosphoryl-halide.

It has furthermore been found that the products obtained in accordance with the invention also have an activity against mites (acari), particularly red spider mites (Tetranychidae). This activity occurs with the same products of which the insecticidal effect is described above.

The tests to determine the insecticidal and acaricidal effects were carried out as follows.

Broad bean plants (*Vicia faba* L) were immersed into an emulsion or a solution of the compound to be tested in water. The compounds were employed with the following concentrations: 1000, 300, 100, 30 and 10 mgs. per litre (p.p.m.). After the emulsion or the solution had dried on the plants, they were infected with adult, unwinged female black bean louse (*Aphis fabae* Scop). Similar experiments were carried out with bush bean plants (*Phaseoli vulgares* L), which were infected with adult female bean red spider (*Tetranychus urticae* Koch).

At the same time test experiments were carried out, the kill of insects and red spider mites on the untreated plants is calculated in the kill percentages in accordance with Abbott's formula. This formula goes:

$$\frac{a-b}{a} \times 100 = \text{kill percentage}$$

wherein $a$ designates the number of survivors on the check plants and $b$ the number of survivors of the object concerned.

With a second series of experiments an emphytical insecticidal effect of the substances obtained in accordance with the method of the invention was determined. With these experiments the same kinds of plants and test animals were used, but in this case the plants were cultivated in paraffined paper beakers, filled with washed sand. The plants were fed on a so-called Knopp's nutrient solution. One litre of this liquid contains 0.25 g. of magnesium sulphate, 1.0 g. of calcium nitrate, 0.25 g. of primary potassium phosphate, 0.12 g. of potasium chloride, a supply of ferrichloride and otherwise water (Koningsberger, Leerboek der algemene Plantkunde, Vol. II, page 465 (1942), Amsterdam).

To the beakers was added a solution or an emulsion of the compound to be tested in water. The doses employed were: 62.5, 12.5, 2.5, 0.5 and 0.1 mgs. of compound per beaker. By screening off the beakers the plants were protected from the vapour of the compound concerned. Then the plants were infected with plant lice and red spider mites respectively.

With the two series of experiments it was determined how many insects or mites were killed three days after the initiation of the infection. The kill on check plants was deducted therefrom. When the kill percentage was 90 to 100%, this was indicated by the sign "+," a percentage of less than 90%, but more than 50% was indicated by "±." A kill percentage of less than 50% was indicated by "—." The results of these experiments are indicated in Table II (FIG. II). In the first left-hand column the Roman ciphers refer to the examples in which are described methods of producing those starting products in which the substituents X, $R_1$, $R_2$, $R_3$, $R_4$ and $R_5$ are indicated in the following six columns. In the head column entitled "*Aphis fabae* Scop" the subcolumn A relates to the so-called, "immersion effect" and the subcolumn B to the "emphytical insecticidal effect." The numbers 1000, 300, 100, 30, 10 indicate the concentrations in mgs. of tested compound per litre (p.p.m.) with which the immersion experiments were carried out. The numbers 62.5, 12.5, 2.5, 0.5 and 0.1 indicate the quantities of tested compound (in mgs.) which were added to each beaker with the emphytical tests. The column "*Tetranychus urticae* Koch" must be understood in a similar manner.

The term "immersion effect" is to be understood to relate to the observations made during the experiments with plants immersed in an emulsion or a solution of the compound to be tested.

A compound obtained in accordance with the invention may be worked up in a conventional manner to obtain a combating means.

To this end they are mixed with solid or liquid carriers or as the case may be, dissolved therein and, if desired enriched with dispersion agents, emulsifiers or wetting agents. Preparations thus obtained may be sprayed, pulverized or nebulized in air, either as such or emulsified or dispersed in a liquid, for example water. Preparations which may be obtained by means of the active compounds are, amongst others, the mixable oils, spray powders and dust powders. These forms are referred to only by way of example and should not restrict the invention thereto.

In order to produce mixable oils, the active compound is dissolved in a suitable solvent which is purely soluble with water, to which solution is added an emulsifier. Suitable solvents may be xylene, toluene, dioxane, petroleum distillates rich in aromatic compounds, for example solvent naphtha, distilled tar oil, tetraline, cyclohexane or mixtures of these liquids. As emulsifiers may be used alkylphenoxy-polyglycol ethers, poly-oxy-ethylene-sorbitane esters of fatty acids or poly-oxy-ethylene sorbitol esters of fatty acids. A plurality of these kinds of emulsifiers are known under the tradename of "Triton," "Tween" and "Atlox."

The concentration of active compound in the purely water-soluble liquid is not subjected to narrow limits. It may fluctuate, for example, between 2 and 50% by weight. Prior to the use of these solutions, the mixable oils are emulsified in water and the emulsion is sprayed out. As a rule, the concentration of active compound in these aqueous emulsions lies between 0.01 and 0.5% by weight.

The spraying powders may be produced by mixing and grinding the active compound with a solid, inert carrier, as a rule, in the presence of a dispersion and/or wetting agent. Prior to use the spraying powders are dispersed in a liquid, preferably in water; the dispersion is sprayed out. It is important that the spraying powder should consist of small particles in order to avoid obturation of the aperture of the volatilizer. It is therefore advisable to use, as a carrier, a fine, pulverulent material. If desired, the mixture of carrier material, active compound and auxiliary substances, if any, is ground.

As a carrier there may be used, for example, alumina, diatomaceous earth, kaolin, dolomite, talcum, gypsum, chalk, bentonite, attapulgite, infusorial earth, Celite, wood flour, tobacco dust or ground coconut shells. Suitable dispersion agents are lignine sulphonates and naphthalene sulphonates. As wetting agents may be used fatty alcohol sulphates, alkyl-arylsulphonates or fatty-acid condensation products, for example those known under the trade name of "Igepon."

Also in the dust powders the concentration of active compounds is not subjected to narrow limits; as a rule, the concentration will be chosen to lie between 10 and 80% by weight.

The dust powders may be produced by applying the active compound as such or dissolved in a solvent to a solid carrier. During the use the preparation thus obtained is pulverized in a dry, finely pulverulent state, in the air. With a choice of suitable, light carrier materials, these powders may, as an alternative, be produced in the manner described for the production of spraying powders. As carriers use may be made of the products referred to above with the production of spraying powders. Usually, the concentration of active compounds in the dust powders is lower than that in the spraying powders or mixable oils, but higher than that of the active compounds in dispersion agents or emulsifiers, obtained by diluting spraying powders or mixable oils with liquids. The dust powders contain frequently 1 to 20% of active compound. It may be redundant to observe that the mixable oils, spraying powders or dust powders according to the invention may be produced by mixing two mixable oils (or spraying and dust powders), containing each one of the active compounds.

In the following examples methods for the production of compounds according to the invention will be described. In these examples "ether" is to be understood to mean diethyl ether and "alcohol" to mean ethanol.

Example I

To a mixture of 134 gs. of 3-amino-triazol-1,2,4, (1.6 mol) 194 gs. of collidine (1.6 mol) and 1.6 l. acetonitril is added in drops, at room temperature, 273 gs. of bis (N.N - dimethyl - amido) - phosphorylchloride (1.6 mol). The mixture is then kept at the same temperature for six hours. During the addition and the further reaction the mixture is stirred. The acetonitril is then distilled off in vacuo. The residue is extracted with benzene. The solution thus obtained is thickened to a small volume. A product is thus crystallized out. After recrystallization from the same solvent a substance is obtained, of which the analysis shows that 1 mol of amino-triazol has reacted with 1 mol of the phosphorylchloride derivative. Yield, 52%. Melting point, 136.5 to 138° C.

Analysis. — Calculated: P=14.19%. Found: P=14.2%.

Remark: The calculated values of the contents of the various elements in the products obtained, indicated in this example and in the following examples relate always to a compound of 1 mol amino-triazol derivative and 1 mol of the derivative of the phosphoryl halogenide.

Example II

Whilst stirring to a mixture of 54 gs. 5-methyl-3-amino-triazol-1.2.4 (0.55 mol) (Thiele, Heidenreich: Berichte 26, page 2599 (1893)), 67 gs. of collidine (0.55 mol) and 300 mls. of acetonitril is added in drops 94 gs. of bis (N.N-dimethylamido) phosphorylchloride (0.55 mol). The mixture is then stirred further for 3.5 hours at a temperature between 60 and 70° C. The acetonitril is then evaporated in vacuo. The residue is extracted with ether. The ethereal solution is thickened and the crystalline mass obtained is recrystallized from ligroine and a mixture of petroleum-ether and ether.

The analysis indicates a reaction between equimolar quantities of the amino-triazol and phosphorylchloride derivatives.

Yield, 53%. Melting point, 91 to 92° C.

Analysis.—Calculated: P=13.34%, C=36.20%, H=7.38%, N=36.19%. Found: P=13.3%; C=35.66%, 35.40%; H=7.53%, 7.51%; N=36.22%, 36.33%.

Example III 7.5 gs. of 5-ethyl-3-amino-triazol-1.2.4 (1/15 mol) (Reilly, Madden, J. Chem. Soc. (1929), page 816), 7.2 gs. of 2.6-dimethyl-pyridine (1/15 mol) and 100 mls. of acetonitril are mixed. To the mixture is added in drops, whilst stirring, 11.4 gs. of bis (N.N-dimethyl-amido)-phosphorylchloride (1/15 mol). After the acid chloride has been added completely, stirring is continued at room temperature for seven hours. Then the acetonitril is distilled off in vacuo. The residue is extracted with acetone. The solution thus obtained was evaporated; the crystalline residue is extracted with benzene. The benzene is evaporated and the crystalline product obtained is recrystallized twice from ligroine. The analysis exhibits that equimolar quantities of starting material have reacted with one another.

Yield: 50%. Melting point, 92 to 95° C.

Analysis.—Calculated: P=12.58%, C=39.02%, H=7.78%, N=34.12%. Found: P=12.7%; C=36.89%, 36.76%; H=7.71%, 7.97%; N=33.78%, 34.22%.

Example IV 13 gs. of 5-(1'-methylethyl)-3-amino-triazol-1.2.4 (0.1 mol) (Reilly, Drumm: J. Chem. Soc. (1925) page 1731), 20 gs. of bis (N.N-dimethylamido)phosphorylchloride (0.12 mol) and 12.1 gs. of triethylamine (0.12 mol) are mixed with 100 mls. of acetonitril. The mixture is heated, whilst stirring at 60 to 65° C. for five hours. The solvent is then distilled off in vacuo. The residue is extracted with acetone. The acetonic solution is inspissated in vacuo and the residue is twice recrystallized from ligroine and once from carbon disulphide. Yield, 50%. Melting point, 101 to 105° C. For analyzing purposes a small qauntity of substance is recrystallized from carbon disulphide. Melting point, 105 to 106° C.

Analysis.—Calculated: P=11.90%, C=41.53%, H=8.13%, N=32.29%. Found: P=12.1%; C=40.95%, 41.11%; H=8.32%, 8.20%; N=33.49%, 33.96%.

Example V

To a mixture of 30.8 gs. of 5-n.pentyl-3-amino-triazol-1.2.4 (0.2 mol) (Kaiser, Peters: Journal Org. Chem. 18, page 196 (1953)), 18.6 gs. of collidine (0.2 mol) and 200 mls. of acetonitril is added in drops, at normal temperature whilst stirring, 42.5 gs. of bis (N.N-dimethylamido)-phosphorylchloride (0.25 mol). Then the mixture is heated at 60 to 70° C. for three and a half hours. When adding acetone, the hydrochloric acid salt of collidine is separated out. It is filtered off. The filtrate is inspissated in vacuo; the residue extracted with benzene, the benzene solution washed, in succession, with 0.5 N hydrochloric acid, water, a solution of sodium bicarbonate and finally again water. The solution is then dried and inspissated. The residue, a crystalline mass, is recrystallized four times from petroleum ether.

Yield, 47%. Melting point, 49 to 53° C. For analyzing purposes a small quantity is recrystallized again from petroleum-ether. Melting point, 52 to 53° C.

*Analysis.*—Calculated: P=10.74%, C=45.82%, H=8.74%, N=29.15%. Found: P=11.0%; C=45.77%, 45.57%; H=8.89%, 8.75%; N=28.98, 28.97%.

*Example VI*

A mixture of 86 gs. (0.5 mol) of amino-guanidine bisulphate (melting point 158 to 160° C.), 72 gs. of caprylic acid (0.05 mol), 20 mls. of water and a few drops of concentrated nitric acid (S.W. 1.4) is heated on an oil bath at 130 to 140° C. for 50 hours.

The reaction mixture is poured out in 200 mls. of water after the reaction was terminated, in a porcelain dish; it is neutralized with 60 gs. (more than 0.5 mol) of anhydrous sodium carbonate until the reaction was weak alkaline and the mixture was evaporated to dryness. The semi-solid mass obtained is extracted with dry benzene and the benzene is distilled off. The crude substance is converted into the nitric acid salt and recrystallized from water. The melting point of the nitrate is 147° C.; with the calculated quantity of methanolic potassium hydroxide solution this nitrate is converted into the free base, which is finally crystallized from ethyl-acetate. The yield is 15 gs.=16% of 3-amino-5-heptyl-triazol-1.2.4; melting point, 120 to 125° C.

*Analysis.*—Calculated: C=59.30%, H=9.95%, N=30.74%. Found: C=59.64%, 59.37%; H=9.95%, 9.87%; N=31.11%, 30.80%.

Remark: For analyzing purposes a small quantity of the substance was recrystallized from a mixture of alcohol and water (1:5); melting point, 134 to 134.5° C. 9.1 gs. of 5-n.heptyl-3-amino-triazol-1.2.4 (1/20 mol), 4.6 gs. of a mixture of α-, β- and γ-picoline (1/20 mol), 8.5 gs. of bis(N.N-dimethylamido)-phosphorylchloride (1/20 mol) and 50 mls. of diethyl ether are heated at 60 to 70° C. whilst stirring, for 6 hours. Then the acetonitril is evaporated in vacuo. The residue is extracted with ether. The ethereal solution is washed with 0.5 N hydrochloric acid and then with water. The solution is dried and the ether evaporated. The residue is purified via alumina. A yellow oil is obtained.

Yield, 31%.

*Analysis.*—Calculated: P=9.79%, C=49.35%, H=9.24%, N=26.56%. Found: P=9.4%; C=47.76%, 48.61%; H=9.34%, 9.49%; N=26.40, 26.21%.

*Example VII*

86 gs. (0.5 mol) of amino-guanidine bisulphate (melting point, 158 to 160° C.) is heated on an oil bath with 100 gs. of lauric acid (0.5 mol) at 150 to 160° C., for 30 hours. After the termination of the reaction the viscous, solid contents of the reaction vessel are transferred with water to a porcelain dish and neutralized with anhydrous sodium carbonate. On the vapour bath the solution is evaporated to dryness. The last remains of water are removed in the vacuum drying chamber, after which the dry substance is pulverized and extracted with absolute alcohol. After cooling the sodium laurate crystals which emanates from the unconverted lauric acid, the laurate is filtered off. The filtrate is inspissated and the solid residue obtained is recrystallized twice from ethyl-acetate. The yield is 38 gs.=32% of 5-undecyl-3-amino-triazol-1,2,4; melting point, 128 to 131° C.

*Analysis.*—Calculated: C=65.50%, H=10.96%, N=23.50%. Found: C=65.43%, 65.15%; H=11.16%, 11.00%; N=23.74%, 23.73%. Remark: A supply of the substance was recrystallized from ethyl-acetate. Melting point: 131 to 132° C. (for analyzing purposes).

A mixture of 5.7 gs. of bis(N.N-dimethylamido)phosphorylchloride (1/30 mol) 7.9 gs. of 5-undecyl-3-amino-triazol-1,2,4 (1/30 mol), 5.3 gs. of 2,6-diethyl-pyridine (1/30 mol) and 75 mls. of benzene are heated at 70 to 80° C. whilst continuously stirring, for 5 hours. Upon cooling the hydrochloric acid salt of 2,6-diethyl-pyridine is separated out. It is filtered off. The filtrate is washed, in succession, with water, a solution of sodium bicarbonate and again water. The solution is dried and the benzene evaporated in vacuo. The crystalline residue is recrystallized from ether. Yield, 45%. Melting point, 46.5 to 47.5° C.

*Analysis.*—Calculated: P=8.31%, C=54.81%, H=10.01%, N=22.56%. Found: P=8.6%; C=55.07%, 54.61%; H=10.19%, 10.05%; N=22.33, 22.52%.

*Example VIII*

8 gs. of 5-phenyl-3-amino-triazol-1,2,4 (1/20 mol) (Benack, Dissert. München, 1896), 6.0 gs. of collidine (1/20 mol) 8.5 gs. of bis(N.N-dimethylamido) phosphorylchloride (1/20 mol) and 50 mls. of acetonitril are mixed and heated at 60 to 70° C., whilst stirring, for 10 hours. Then the acetonitril is removed by distillation in vacuo. The residue is extracted with benzene. The solution obtained is evaporated in vacuo. The remaining crystalline mass is recrystallized from aqueous alcohol. Yield, 71%. Melting point, 167.5 to 168° C.

*Analysis.*—Calculated: P=10.52%, C=48.97%, H=6.51%, N=28.56%. Found: P=10.7%; C=49.03%, 49.21%; H=6.51%, 6.55%; N=28.58, 28.61%.

*Example IX*

A mixture of 86 gs. (0.5 mol) of amino-guanidine bisulphate (melting point, 158 to 160° C.), 68 gs. (0.5 mol) of phenyl-acetic acid, 5 mls. of water and a few drops of concentrated nitric acid is heated in an oil bath at 130 to 140° C., for 30 hours. After the termination of the reaction the clear solution is transferred with about 70 mls. of water to a porcelain dish, neutralized with 55 gs. of anhydrous sodium carbonate until the reaction was weak alkaline. The solution obtained is evaporated to dryness and then extracted with, in total, 30 mls. of absolute alcohol. After filtration the alcohol is distilled off and the residue is crystallized from water. The yield is 36 gs.=41% of 3-amino-5-benzyl-triazol-1,2,4; melting point, 170 to 170.3° C.

*Analysis.*—Calculated: C=62.05%, H=5.78%, N=32.16%. Found: C=62.52%, 62.41%; H=5.96%, 5.59%; N=32.28%, 32.32%.

Whilst stirring, a mixture of 11.6 gs. of 5-benzyl-3-amino-triazol-1,2,4 (1/15 mol), 8.1 gs. of collidine (1/15 mol), 11.4 gs. of bis(N.N-dimethylamido)-phosphorylchloride (1/15 mol) and 75 mls. of acetonitril is heated at 70° C. for 8 hours. The solvent is then evaporated in vacuo. The residue is extracted with benzene. The extract is inspissated in vacuo; a crystalline substance is left. This crystalline product is recrystallized from aqueous alcohol. The substance crystallizes with 1 mol of crystal water. Yield, 60%. Melting point, 107 to 108° C. The anhydrous substance melts at 130.5 to 131° C.

*Analysis.*—Calculated: P=9.49%, C=47.84%, H=7.10%, N=25.75%. Found: P=9.6%, 9.9%; C=47.8%, 47.75%; H=7.26%, 7.26%; N=25.32%, 25.32%.

*Example X*

A mixture of 86 gs. (0.5 mol) of amino-guanidine bisulphate (melting point 158 to 160° C.), 74 gs. of transcinnamic acid (0.5 mol) 5 mls. of water and a few drops of concentrated nitric acid is heated in an oil bath at 145 to 150° C., for 50 hours. The mixture is then transferred with 150 mls. of water to a porcelain dish, neutralized with anhydrous sodium carbonate and evaporated to dryness on a vapour bath. The dry mass is extracted with absolute alcohol, the alcohol is distilled off partly and after the addition of ethyl-acetate, the base is converted into the nitrate. The melting point of the nitrate is, after recrystallisation from water, about 260° C. The free base is obtained therefrom by means of the calculated quantity of methanol/KOH. The substance is recrystallized from methanol/water (2:5). The yield is 5 gs.=5% of 3-amino-5-styryl-triazol-1,2,4; melting point, 231.5 to 233.5° C.

*Analysis.*—Calculated: C=64.49%, H=5.41%, N=30.09%. Found: C=64.33%, 64.54%; H=5.53%, 5.75%; N=29.84%, 29.87%.

4.9 gs. of 3-amino-5-styryl-triazol-1,2,4 (0.026 mol), 3.2 gs. of collidine (0.026 mol), 4.5 gs. of bis(N.N-dimethylamido) phosphorylchloride (0.026 mol) and 50 mls. of acetonitril are heated, whilst stirring, at 60 to 70° C. for 17 hours. Then the acetonitril is distilled off in vacuo. The residue is extracted with benzene. The crystalline substance, which separates out during the distillation of benzene, is isolated by filtration and recrystallized from ligroine.

Yield, 58%. Melting point, 149.5 to 152.5° C.

*Analysis.*—Calculated: P=9.67%, C=52.49%, H=6.61%, N=26.23%. Found: P=10.0%; C=52.44%, 52.46%; H=6.77%, 6.64%; N=25.87%, 25.95%.

Example XI

To a mixture of 4.2 gs. of 3-amino-triazol-1,2,4 (1/20 mol) 6.0 gs. of collidine (1/20 mol) and 50 mls. of acetonitril is added 11.3 gs. of bis(N.N-diethylamido)phosphorylchloride (1/20 mol). The mixture obtained is heated at 70 to 80° C., whilst stirring, for 7 hours. Then the acetonitril is evaporated in vacuo. The residue is extracted with benzene. The solution in benzene is inspissated; the mass obtained is recrystallized from water.

Yield, 53%. Melting point, 105 to 106° C.

For analyzing purpose a small quantity is recrystallized from water. Melting point, 106 to 106.5°.

*Analysis.*—Calculated: P=11.29%, C=43.78%, H=8.45%, N=30.64%. Found: P=11.3%; C=43.66%, 43.61%; H=8.65%, 8.70%; N=30.11%, 30.36%.

Example XII 6.3 gs. of bis(N.N-diethylamido)phosphorylchloride (0.28 mol) is added, whilst stirring, to a mixture of 4.2 gs. of 5n-pentyl-3-amino-triazol-1,2,4 (0.28 mol) 3.4 gs. of collidine (0.28 mol) and 40 mls. of ether. The mixture is heated at 70 to 75° C., whilst stirring, for 6 hours. Then the acetonitril is removed by distillation in vacuo and the residue is extracted with ether. The ethereal solution is washed with water, dried and inspissated. The residue is dissolved in petroleum ether. This solution is washed with water and after drying, it is inspissated. An oil is obtained, which crystallizes after some time. Yield, 87%.

*Analysis.*—Calculated: P=8.99%. Found: P=9.1%.

Example XIII

A mixture of 16.8 gs. of 3-amino-triazol-1.2.4 (2.10 mol), 18.65 gs. of bis(N.N-dimethylamido)thiophosphorylchloride (1/10 mol) and 300 mls. of acetonitril is heated at 65 to 70° C., whilst continuously stirring, for 8 hours. The acetonitril is then removed by distillation in vacuo. To the solid residue water is added. The part not soluble in water is filtered off and crystallized from water. Yield, 22%. Melting point, 120 to 121° C.

*Analysis.*—Calculated: P=13.22%, S=13.68%. Found: P=13.1%, S=13.5%.

Example XIV

In 25 mls. of anhydrous pyridine is dissolved 7.7 gs. of 3-amino-5-n.-pentyltriazol-1.2.4 (0.05 mol). To the solution is added in drops 9.3 gs. of bis(N.N-dimethylamido) thio-phosphorylchloride (0.05 mol). The mixture is then evaporated in vacuo and to the residue water is added. The oil obtained is extracted with ether. The ethereal extract is washed with water, dried and inspissated. The residue is a crystalline product. Yield, 65%. Melting point, 139 to 140° C.

*Analysis.*—Calculated: P=10.18%, C=43.40%, H=8.28%, N=27.61%, S=10.53. Found: P=10.3%; C=43.90%, 43.51%; H=8.32%, 8.31%; N=26.35%, 26.89%; S=10.67%, 10.63%.

Example XV 7.78 gs. of 5-(4'-chloro-phenyl)-3-amino-triazol-1.2.4 (0.04 mol) (Hoggarth, J. Chem. Soc. (1950), 612,), 4.84 gs. of collidine (0.04 mol) and 6.62 gs. of bis (N.N-dimethylamido)-phosphorylchloride are mixed with 100 mls. of acetonitril. The mixture is stirred at a temperature between 70 and 75° C. for six hours. Then the acetonitril is evaporated in vacuo. The residue is extracted a few times with hot benzene. The benzene is evaporated; the crystalline product obtained is recrystallized from a mixture of ethanol and water.

Yield: 73%. Melting point: 170 to 171° C.

*Analysis.*—Calc.: C=43.84%, H=5.52%, N=25.56%, Cl=10.79%, P=9.42%. Found: C=44.20%, 44.50%; H=5.81%, 5.88%; N=26.17%, 26.33%; Cl=11.03%, 11.11%; P=9.4%.

Example XVI 5.7 gs. of 5-(4'-methoxyphenyl)-3-amino-triazol-1.2.4 (0.03 mol) (Hoggarth, J. Chem. Soc. (1950), 612), 4 gs. of collidine (0.03 mol) and 5.1 gs. of bis (N.N-dimethylamido)-phosphorylchloride (0.03 mol) are joined in 100 mls. of acetonitril. The mixture is then stirred at a temperature of 75 to 80° C. for six hours. Then the acetonitril is removed by evaporation in vacuo. The residue is extracted a few times with dry benzene. The benzene is evaporated and the remaining crystalline product is recrystallized from a mixture of water and alcohol (1:3).

Yield: 72%. Melting point: 173 to 174° C.

*Analysis.*—Calc.: C=48.14%, H=6.52%, N=25.91%, P=9.55%. Found: C=48.46%, 48.64%; H=6.58%, 7.11%; N=25.50%, 25.52%; P=9.55%.

Example XVII 7.8 gs. of 5-carbaethoxy-3-amino-triazol-1.2.4 (0.05 mol) (Thiele Manchot, Ann. 303 54 (1898)) 6.0 gs. of collidine (0.05 mol) and 8.5 gs. of bis (N.N-dimethylamido)-phosphorylchloride (0.05 mole) are mixed with 100 mls. of acetonitril. The mixture is heated, whilst stirring, at 50 to 60° C. for 24 hours. Then the acetonitril is removed by evaporation. The residue is extracted with cold water and then with a mixture of acetone and ethanol. The acetone and the ethanol are evaporated. The remaining crystalline product is recrystallized from water.

Yield: 51%. Melting point: 151 to 153° C.

*Analysis.*—Calc.: P=10.67%, C=37.24%, H=6.60%, N=28.95%. Found: P=10.3%; C=36.61%, 36.64%; H=6.57%, 6.59%; N=28.94%, 29.16%.

Example XVIII 23.6 gs. of 3-amino-triazol-1.2.4-carboxylic acid-5 (0.185 mol) is dissolved in 75 mls. of n.pentanol. Dry HCl-gas is passed through the solution; then the solution is boiled for 6 hours. The n.pentanol is removed by evaporation in vacuo. The residue is extracted with cold water and then crystallized from a mixture of ethanol and water.

Yield: 26%. Melting point: 168 to 169° C. (5-carb-n-pentoxy-3-amino-triazol-1.2.4).

*Analysis.*—Calc.: C=48.47%, H=7.12%, N=28.27%. Found: C=46.92%, 47.20%; H=7.37%, 7.30%; N=27.63%, 27.35%.

7.92 gs. of 5-carb-n.pentoxy-3-amino-triazol-1.2.4 (0.04 mol) 4.82 gs. of collidine and 682 gs. of bis (N.N-dimethylamido)-phosphorylchloride (0.04 mol) are mixed with 75 mls. of acetonitril. The mixture is heated, whilst stirring, at 70° C. for six hours. The acetonitril is removed by evaporation in vacuo. The residue is suspended in water. The crystalline product is filtered off and recrystallized from ligroin.

Yield: 45%. Melting point: 105 to 107° C.

*Analysis.*—Calc.: P=9.32%, C=43.37%, H=7.59%, N=25.29%. Found: P=9.27%; C=43.94%, 43.65%; H=7.65%; N=26.31%, 26.34%.

Example XIX 25.6 gs. of 3-amino-triazol-1.2.4-carboxylic acid-5 (0.2 mol) is mixed with 100 mls. of isopropanol. Dry HCl gas is passed through the mixture; then the mixture is boiled for 12 hours. The isopropanol is removed by evaporation in vacuo. The residue is dissolved in a small quantity of water and neutralized with sodium carbonate. The isopropyl-ester is precipitated and filtered off.

Yield: 34%. Melting point: 253 to 254° C. (5-carb-isopropoxy-3-amino-triazol-1.2.4).

Analysis.—Calc.: C=42.35%, H=5.91%, N=32.92%. Found: C=42.49%, 42.52%; H=5.88%, 5.96%; N=32.91%; 33.19%.

11.9 gs. of 5-carb-isopropoxy-3-amino-triazol-1.2.4 (0.07 mol), 8.1 gs. of collidine ($\frac{1}{15}$ mol) and 75 mls. of acetonitril are mixed. Whilst stirring the mixture has added to it 12.0 gs. of bis (N.N-dimethyl-amido)-phosphorylchloride. The mixture is heated at a temperature of 70 to 80° C. for 10 hours. The acetonitril is removed by evaporation. The residue is suspended in water. The crystalline product is filtered off and recrystallized from water.

Yield: 59%. Melting point: 181 to 182° C.

Analysis.—Calc.: C=39.47%, H=6.96%, N=27.62%, P=10.18%. Found: C=39.46%, 39.88%; H=7.14%, 7.19%; N=26.68%, 26.91%; P=10.18%.

Example XX

In a solution of 2.3 gs. of sodium (0.1 mol) in 65 mls. of methanol is dissolved 15.4 gs. of 5-pentyl-3-amino-triazol-1.2.4 (0.1 mol). Then 20 gs. of bis (N.N-dimethylamido)-phosphorylchloride is added in drops. Then the mixture is stirred for 25 hours at a temperature of about 80° C. After cooling the formed NaCl is filtered off; the filtrate is concentrated by evaporation and the residue received in ether. The ethereal solution is washed three times with a small quantity of water, dried on sodium sulphate and concentrated by evaporation. The residue is recrystallized from a mixture of petroleum ether (boiling range 40 to 60° C.) and ether (3–1).

Yield: 15.9 gs. (55%). Melting point: 51 to 53° C.

Example XXI

In a solution of 2.3 gs. of sodium (0.1 mol) in 100 mls. of methanol is dissolved 16.0 gs. of 5-phenyl-3-amino-triazol-1.2.4 (0.1 mol).

The methanol is evaporated in vacuo and the remaining salt is suspended in 80 mls. of acetonitril. To the suspension is added 20 gs. of bis (N.N-dimethyl-amido)-phosphorylchloride. The mixture is then heated whilst stirring, for 2.5 hours at 80 to 85° C. The solution is filtered hot and the filtrate is concentrated by evaporation. The residue, a crystalline product, is recrystallized from a mixture of ethanol and water (1:3).

Yield: 23.4 gs. (80%). Melting point 167 to 168° C.

Example XXII

In 55 mls. of anhydrous ethanol are dissolved 2 gs. of NaOH ($\frac{1}{20}$ mol) and 8 gs. of 5-phenyl-3-amino-triazol-1.2.4 ($\frac{1}{20}$ mol). To the solution is added 10 gs. of bis (N.N-dimethylamido)-phosphorylchloride at a temperature of 0 to 5° C. The reaction mixture is then stirred at 0 to 5° C. for four hours. The NaCl obtained is filtered off. The filtrate is concentrated by evaporation and the residue is recrystallized from a mixture of alcohol and water (1–3).

Yield: 10.8 gs. (73%). Melting point: 167 to 168° C.

Example XXIII 4 gs. of 5-phenyl-3-amino-triazol-1.2.4 ($\frac{1}{40}$ mol) is dissolved in a solution of 1 g. of sodium hydroxide ($\frac{1}{40}$ mol) in 20 mls. of methanol. To the solution is added dripwise, whilst stirring, 5 gs. of bis (N.N-dimethyl-amido)-phosphorylchloride at a temperature of about —10° C. Then stirring is continued for one hour at a temperature between —10 and 10° C. The reaction mixture is filtered and the methanol removed by evaporation in vacuo. The crystalline product is suspended in 50 mls. of 0.5 N-caustic soda lye and then filtered off.

Yield: 81%. Melting point: 165 to 166° C.

Example XXIV 4 gs. of 5-phenyl-3-amino-triazol-1.2.4 ($\frac{1}{40}$ mol) is introduced into a suspension of 7.96 gs. of $Ba(OH_2).8H_2O$ in 50 mls. of ethanol. To the mixture is added dripwise 5 gs. of bis (N.N-dimethylamido)-phosphorylchloride at a temperature of about —10° C. The mixture is then stirred for three hours. The deposit obtained is filtered off and the solution is concentrated by evaporation in vacuo. The crystalline residue is suspended in 50 mls. of 0.5 N-caustic soda and then filtered off.

Yield: 70%. Melting point: 166 to 167° C.

Example XXV

In 25 mls. of ethanol are introduced 1 g. of NaOH ($\frac{1}{40}$ mol) (as a 50% solution in water) and 4 gs. of 5-phenyl-3-amino-triazol 1.2.4 ($\frac{1}{40}$ mol.). Then at a temperature between 0 and 5° C., 5 gs. of bis (N.N-dimethylamido)-phosphorylchloride is added dripwise. The solution is then stirred further for three hours at the same temperature. The NaCl is filtered off, the filtrate is concentrated by evaporation and the residue is crystallized from a mixture of ethanol and water (1–3).

Yield: 5.2 gs. (71%). Melting point: 167 to 168° C.

Example XXVI

Into 35 gs. of anhydrous ethanol are introduced 1.0 g. of NaOH ($\frac{1}{40}$ mol) (as a 50% solution in water) and 3.85 gs. of 5-pentyl-3-amino-triazol-1.2.4 ($\frac{1}{40}$ mol). At a temperature between 0 and 5° C. is added dripwise 5 gs. of bis (N.N-dimethylamido)-phosphorylchloride. The mixture is then stirred furthermore for 2.5 hours at the same temperature. The NaCl obtained is filtered off and the filtrate is concentrated by evaporation. The residue is dissolved in ether and the solution in ether is washed three times with a small quantity of water (until the reaction is neutral). The ethereal extract is dried and concentrated by evaporation.

Yield: 6.76 gs. (94%). Melting point: 42 to 49° C.

After a double crystallization, once from petroleum ether (40 to 60) and once from a mixture of petroleum ether (boiling range 40 to 60° C.) and ether (2–1) a melting point of 51 to 52° C. is reached.

Example XXVII

Into 50 mls. of a 50% by weight solution of KOH in water is suspended 4 gs. of 5-phenyl-3-amino-triazol-1.2.4 ($\frac{1}{40}$ mol). To the suspension is added dripwise, at —50° C. to —10° C., 5 gs. of bis (N.N-dimethylamido)-phosphorylchloride, after stirring is continued for 2.5 hours at the same temperature. The reaction mixture is diluted with 100 mls. of water and the product separated out is filtered off.

Yield: 5.63 gs. (77%). Melting point: 166 to 167° C.

Example XXVIII

In 50 mls. of water are dissolved 2 gs. of NaOH ($\frac{1}{20}$ mol) and 8 gs. of 5-phenyl-3-amino-triazol-1.2.4 ($\frac{1}{20}$ mol). To the solution thus obtained is added 10 gs. of bis (N.N-dimethylamido)-phosphorylchloride at a temperature between 0 and 5° C., after which stirring is continued for 2.5 hours. The precipitate is filtered off and extracted with chloroform. The residue is 5-phenyl-3-aminotriazol-1.2.4.

Yield: 5.85 gs. (73%). Melting point: 184 to 187° C.

The solution in chloroform is concentrated by evaporation; the residue is crystallized from a mixture of ethanol and water (1–3).

Yield: 0.78 gs. (5.3%). Melting point: 165 to 167° C.

Example XXIX 8 gs. of 5-phenyl-3-amino-triazol-1.2.4 (0.05 mol) and 50 mls. of 30% by weight of sodium hydroxide are joined. To the mixture is added dripwise, whilst stirring, 10 gs. of bis (N.N-dimethylamido)-phosphorylchloride at a temperature of −5 to −10° C. The whole mixture is then stirred again for 1.5 hours at a temperature of about 0° C. Then 100 mls. of water is added. The precipitated crystalline product is filtered off.

Yield: 22%. Melting point: 166 to 167° C.

What is claimed is:

1. An aminotriazole phosphorus compound of the formula

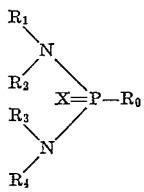

wherein $R_1$, $R_2$, $R_3$, $R_4$ are each alkyl of from 1 to 5 carbon atoms, X is a bivalent atom selected from the group consisting of sulfur and oxygen, $R_0$ is 3-aminotriazole 1,2,4 wherein the 5 carbon is directly joined to a member of the group consisting of hydrogen, phenyl, 4-chloro-phenyl, 4-methoxy phenyl, styryl, alkyl of 1-8 carbon atoms and carbo-lower alkoxy and wherein the phosphorus is joined directly to a ring nitrogen of the triazole moiety.

2. Bis (dimethylamido) phosphoryl-5-phenyl-3-aminotriazole-1,2,4 wherein the phosphorus is directly attached to a ring nitrogen.

3. Bis (dimethylamido) phosphoryl-5-n-pentyl-3-aminotriazole-1,2,4 wherein the phosphorus is directly attached to a ring nitrogen.

4. Bis (dimethylamido) phosphoryl-5-ethyl-3-aminotriazole-1,2,4 wherein the phosphorus is directly attached to a ring nitrogen.

5. Bis (dimethylamido) phosphoryl-5-isopropyl-3-aminotriazole-1,2,4 wherein the phosphorus is directly attached to a ring nitrogen.

6. Bis (dimethylamido) phosphoryl-5-methyl-3-aminotriazole-1,2,4 wherein the phosphorus is directly attached to a ring nitrogen.

7. Bis (dimethylamido) phosphoryl-5-n-heptyl-3-aminotriazole-1,2,4 wherein the phosphorus is directly attached to a ring nitrogen.

8. Bis (dimethylamido) phosphoryl-5-benzyl-3-aminotriazole-1,2,4 wherein the phosphorus is directly attached to a ring nitrogen.

9. Bis (dimethylamido) phosphoryl-3-aminotriazole-1,2,4 wherein the phosphorus is directly attached to a ring nitrogen.

10. Bis (dimethylamido) thionophosphoryl-5-n-pentyl 3-aminotriazole-1,2,4 wherein the phosphorus is directly attached to a ring nitrogen.

References Cited in the file of this patent

UNITED STATES PATENTS

| | | |
|---|---|---|
| 2,751,384 | Coover et al. | June 19, 1956 |
| 2,752,392 | Saul et al. | June 26, 1956 |
| 2,800,486 | Grundmann et al. | July 23, 1957 |
| 2,822,313 | Nolan et al. | Feb. 4, 1958 |
| 2,824,823 | Wolf | Feb. 25, 1958 |
| 2,843,586 | Melamed | July 15, 1958 |
| 2,888,461 | Klingsberg | May 26, 1959 |
| 2,914,536 | Hardy et al. | Nov. 24, 1959 |
| 3,008,941 | Lynn | Nov. 14, 1961 |

OTHER REFERENCES

Doak et al.: J. Am. Chem. Soc., volume 76, pages 1621–3 (1954).

Doak et al.: J. Am. Chem. Soc., volume 77, pages 4825–6 (1955).

UNITED STATES PATENT OFFICE
CERTIFICATE OF CORRECTION

Patent No. 3,121,090                  February 11, 1964

Martinus Johannes Koopmans et al.

It is hereby certified that error appears in the above numbered patent requiring correction and that the said Letters Patent should read as corrected below.

Column 5, line 25, for "sodium" read -- sodium alcoholate --; column 7, line 11, for "anti-eryisphaceaes" read -- anti-erysiphaceaes --; column 11, line 6, for "28.98" read -- 28.98% --; line 46, for "47.76%" read -- 48.76% --; column 14, line 3, for "6.62" read -- 6.82 --; line 39, for "mole" read -- mol --; same column 14, line 65, for "682" read -- 6.82 --.

Signed and sealed this 27th day of October 1964.

(SEAL)
Attest:

ERNEST W. SWIDER
Attesting Officer

EDWARD J. BRENNER
Commissioner of Patents